No. 640,754. Patented Jan. 9, 1900.
D. DENIS.
POTATO DIGGER.
(Application filed May 16, 1899.)
(No Model.) 4 Sheets—Sheet 1.
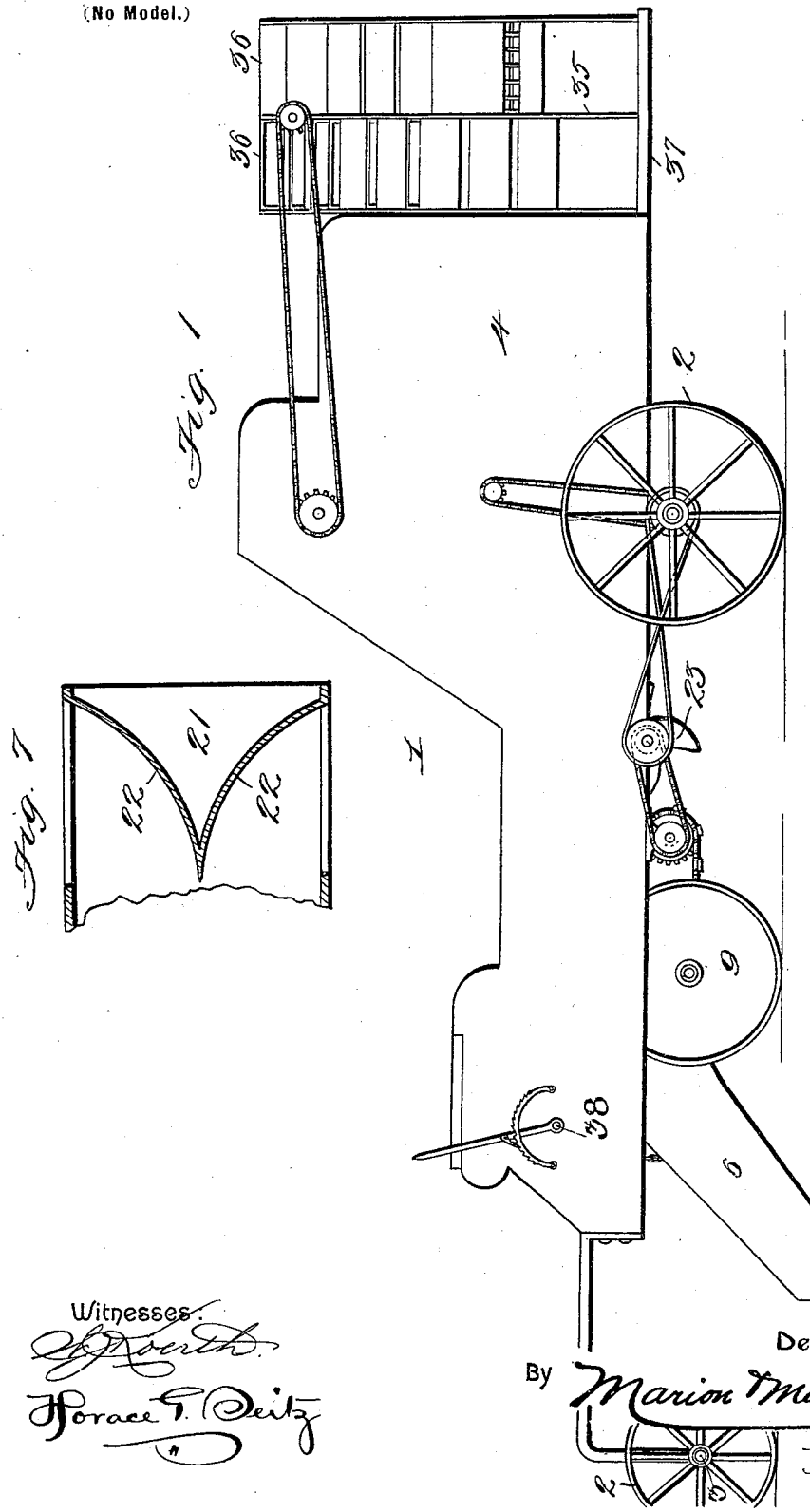

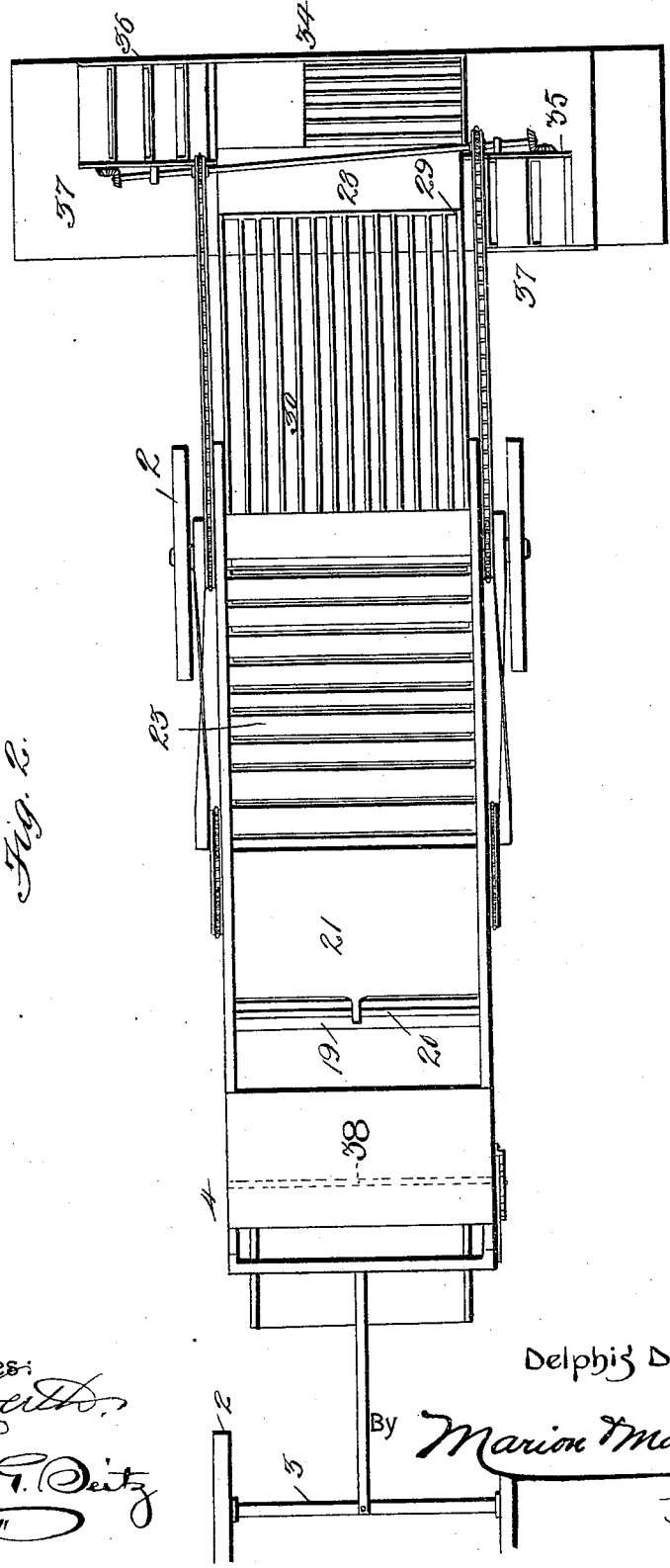

No. 640,754. Patented Jan. 9, 1900.
D. DENIS.
POTATO DIGGER.
(Application filed May 16, 1899.)
(No Model.) 4 Sheets—Sheet 3.
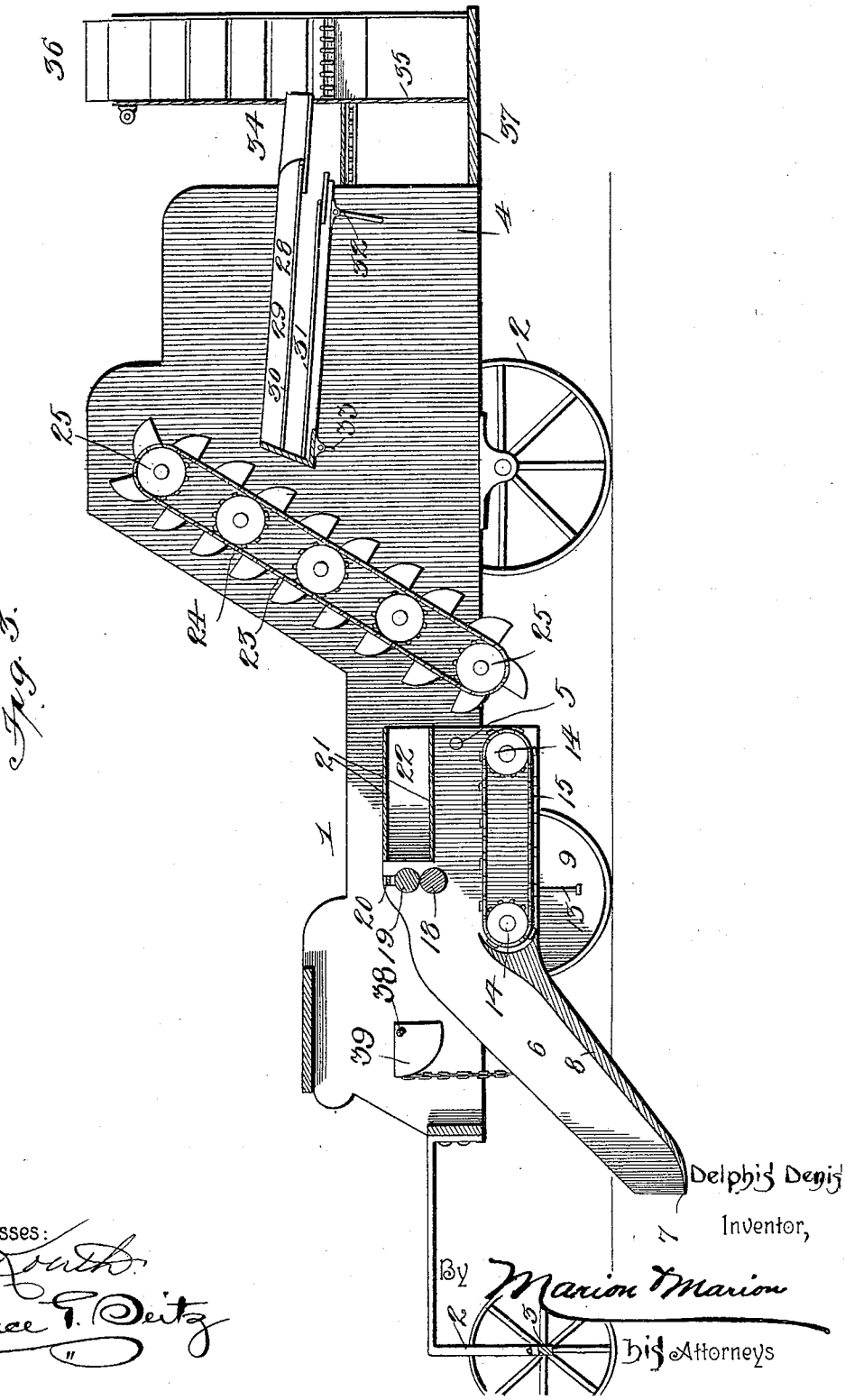
Witnesses:
Delphis Denis Inventor,
By Marion & Marion his Attorneys No. 640,754.  
D. DENIS.  
POTATO DIGGER.  
(Application filed May 16, 1899.)  
(No Model.)  
Patented Jan. 9, 1900.
4 Sheets—Sheet 4.
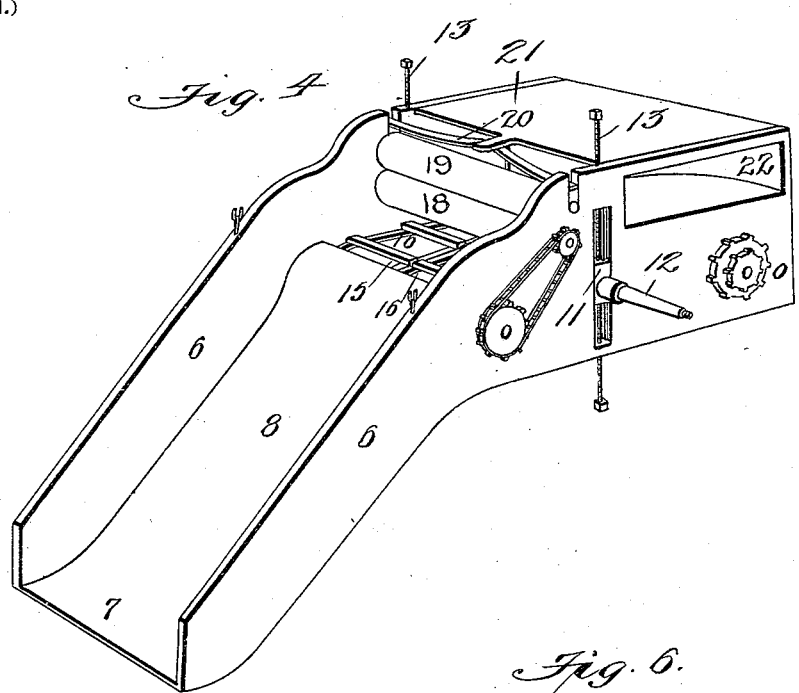
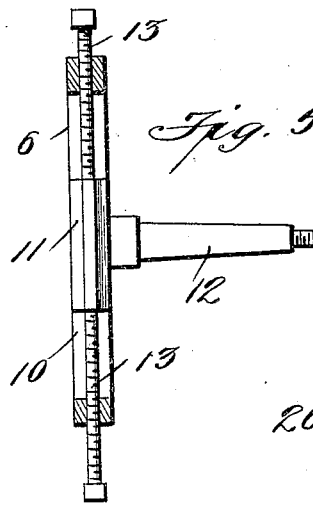
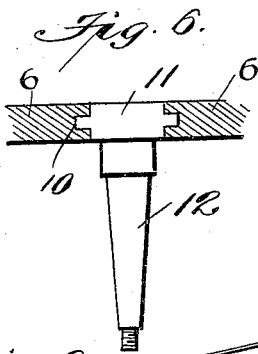
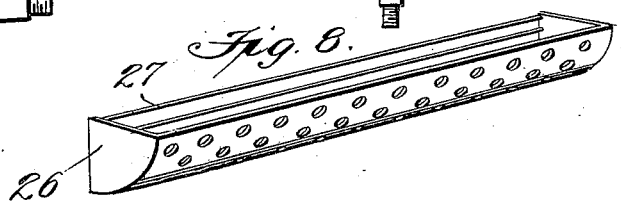
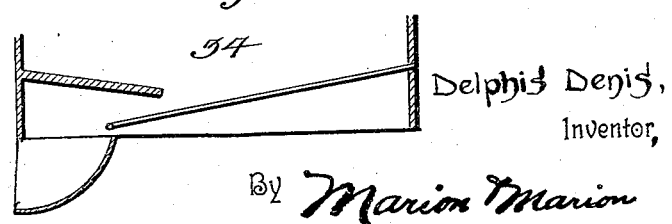
Delphis Denis,  
Inventor,  
By Marion Marion  
his Attorneys.

UNITED STATES PATENT OFFICE.

DELPHIS DENIS, OF ST. BENOIT, CANADA.

POTATO-DIGGER.

SPECIFICATION forming part of Letters Patent No. 640,754, dated January 9, 1900.

Application filed May 16, 1899. Serial No. 717,106. (No model.)

*To all whom it may concern:*

Be it known that I, DELPHIS DENIS, a subject of Her Majesty the Queen of Great Britain, residing at St. Benoit, county of Two Mountains, Province of Quebec, Canada, have invented certain new and useful Improvements in Potato-Diggers; and I do hereby declare that the following is a full, clear, and exact description of the invention, such as will enable others skilled in the art to which it appertains to make and use the same.

My invention relates to improvements in potato-diggers.

One object of my invention is to provide a digger which will, during the passage over the potato-row, automatically remove the potatoes from the ground, the removal including the ground within which the potatoes lie and the potatoes including the potato-stalks, the entire removed part being carried onto an endless belt from where the stalks are automatically removed from the potatoes, and the ground automatically shaken from the potatoes, after which the potatoes are automatically assorted and delivered into bags.

A further object is to provide a construction which is simple and efficient in operation, durable in construction, and which can be made at a moderate cost.

With these and other objects in view, the nature of which will hereinafter appear, my invention consists in the improved construction and combination of parts, hereinafter fully described, and particularly pointed out within the appended claims.

In the accompanying drawings, forming a part of this specification and in which similar numerals of reference indicate similar parts in all of the views, Figure 1 is a side elevation of my improved digger. Fig. 2 is a top plan view of the same. Fig. 3 is a central vertical longitudinal sectional view of the same. Fig. 4 is a detail view of the digger and the mechanism for removing the stalks from the potatoes. Fig. 5 is a vertical sectional view showing the mounting for the digger-supporting wheel. Fig. 6 is a sectional view taken at right angles to Fig. 5. Fig. 7 is a sectional view showing the construction of the delivery passage-way for the potato-stalks. Fig. 8 is a detail of one of the buckets. Fig. 9 is a cross-section through one of the rear elevators and the table.

In machines of this character it is essential to the various operations which are necessary to remove the potatoes without injuring them that the work be done in a careful manner, and inasmuch as the saving in the harvesting in a potato-crop must necessarily depend upon the reduction of the number of persons assisting it will be readily understood that the working of the parts should be done as automatically as possible, and in order that such careful and automatical operations may be obtained I construct the device to operate in a manner substantially similar to the digging of potatoes by hand.

In the construction hereinafter set forth the general operation of the parts is substantially as follows: The device is passed over the row in which the potatoes are located, and a digger passes into the ground to a point below the level of the potatoes, the digger being formed substantially similar to a scoop. The passage of this digger causes the entire quantity of earth and potatoes to be forced upwardly onto a traveling belt which is moving rearwardly. During this rearward passage the stalks which are retained on the upper surface of the earth are automatically passed between two rollers, which serve to detach the stalks from the potatoes, at the same time loosening up the dirt which is on the potatoes, the stalks being passed outward through separate passage-ways to the outer side of the digger and entirely away from any liability of the stalks passing into the cleansing portion of the machine. The potatoes are carried rearwardly, the shaking received by reason of the removal of the stalks having a tendency to remove a portion of the dirt, and are then passed into a series of buckets, preferably perforated, formed on an inclined elevator, which serves to carry the potatoes and whatever dirt that may have remained on the potatoes upwardly and drop the entire contents onto a suitable shaker and assorter, over which they are passed, and during such passage become cleansed and assorted. By the movement of the shaker and assorter the potatoes are then carried rearwardly and onto a series of grated supports, which serve to pass the potatoes into suitable elevators, from which they are passed to the bags. During the entire movement of the potatoes they are placed in perforated or grated receptacles or on tables having such form, so that each movement of the machine tends to free the potatoes from the dirt, while the elimination of the stalks primarily, by reason of their removal, is advantageous, as there is no liability of the parts becoming choked up by the stalks during the operation of the machine.

In order that a thorough and complete understanding may be had of the construction and the detailed operation of the various parts, I will now proceed to describe the parts in detail and in combination, referring for a clearer construction of the description to the accompanying drawings.

1 designates the framework of my improved digger, mounted on the supporting-wheels 2, the front pair of which are mounted on an axle 3, which is pivotally connected (see Fig. 3) in order that the digger may be readily turned, the frame 1 being provided at its front end with a "gooseneck" to enable the front wheel to turn to proper position. The frame 1 consists, essentially, in the side pieces 4, extending from the front to the rear of the machine or digger, the mechanism hereinafter described being located generally within the space formed between the two sides 4. In describing the mechanism, I will do so as it is successively reached in its operation, by means of which the passage of the potatoes and the stalks can be readily traced, and the operation better understood.

The mechanism first brought into operation is that used for digging the potatoes from the ground, and this mechanism is removably secured between the side pieces 4 by suitable connecting-bolts 5 passing through the sides of the digger and the sides 4, this construction enabling the digger to have a pivotal movement if, by reason of the rough surface of the ground, it is necessary that such pivotal movement be obtained.

As shown in the drawings, the digger is formed of the sides 6, which extend forwardly a suitable distance, from the front end of which extends the digging-nose 7, which is formed substantially as shown in the drawings, being formed of the side and bottom, the bottom 8 having its forward end rounded, as shown, which enables it to pass forward through the ground without having a tendency to pass deeper into the ground than is desirable. The front end of the side of the digger-nose, as well as the bottom 8, is preferably brought to a thin edge in order that it may better pass through the ground, eliminating to a great extent the heavy pull which is placed upon the draft-animals. As it is necessary that the digger-nose pass into the ground below the level of the potatoes and as the potatoes lie at varying depths within the ground, it is essential that the depth to which the nose may be passed can be adjustably regulated, and this is accomplished by placing the connecting-bolts 5, forming the pivot-point for the digger, at a point near the rear end of the digger and providing the digger at a suitable point in front of the bolts 5 with a pair of supporting-wheels 9, which are adjustably mounted on the side 6 by the mechanism shown in Figs. 5 and 6. This mounting consists, essentially, in forming within the sides and extending vertically therein a dovetail or tongue-and-grooved recess 10, within which is mounted a block 11, having its edges formed to fit the recess 10. To the blocks 11 are secured laterally-extending bearing-pins 12, upon which the wheels 9 are adapted to rotate. To regulate the position of the block 11, I provide suitable screw-threaded pins 13 on both the upper and lower side of the blocks, said pins serving to adjust the height of the block 11 as regards the side 6 and securely hold said blocks in their adjusted position.

In rear of the digger-nose 7 is mounted on suitable rolls 14 an endless belt 15, formed of two bands 16, traveling on opposite sides, said bands being connected by suitable rods, said rods being placed a small distance apart in order that the ground, which is brought up by the digger-nose, may pass therethrough, the ground being shaken from the potatoes during the removal of the stalks, as hereinafter described. This band is driven by suitable connection from the rear wheels 2 in an obvious manner.

At a suitable point in the side 6 above the endless belt 15 I place a roller 18, which is adapted to be driven by means of a suitable belt connected to one of the rolls 14. Above the roller 18 is provided a suitable roller 19, which is mounted in bearings having a vertical movement, said bearings being held in a downward position by means of a spring 20, thus causing the roller 19 to normally come in contact with the roller 18. In rear of the rollers 18 and 19 is secured an attachment (best shown in Fig. 7) consisting of a top and bottom 21, between which is formed a vertical wall 22, said wall extending from a point centrally of the rollers toward each side in a curved direction, forming a passage-way which leads to and through the side 6, through which passage-way the stalks are passed as they are received from the rollers 18 and 19, the latter receiving the stalks as they are passed rearwardly with the potatoes and the earth as taken up by the digger-nose. From this construction it will be seen that as the digger-nose carries the earth, potatoes, and stalks upward on the endless belt 15 the rollers 18 and 19 grip the stalks and in an obvious manner break up the earth, and as it passes rearwardly over the belt 15 a portion of the dirt is automatically removed.

In rear of the digger is provided a suitable elevator 23, formed of a suitable endless bucket-chain 24, said chain being passed over suitable top and bottom rolls 25, as best shown in Fig. 3, said bucket-chain being adapted to receive the potatoes from the belt 15 and carry them upwardly, dropping them at the upper end onto a suitable cleaner and assorter, constructed as hereinafter set forth. The bucket is formed substantially as shown in Fig. 8, comprising a curved outer portion, the side 26, and the rods 27, extending along the rear open face of the bucket. As shown, the curved portion is perforated, which perforations, together with the spaces formed between the rods 27, allow of the escape of earth from the potatoes during the upward movement of such bucket.

The cleaner and assorter 28, on which the potatoes are dropped from the elevator 23, consists of a frame 29, within which are removably secured the grated screens 30 and 31, the bars of which extend lengthwise of the digger, the bars of the upper screen being of less number than those of the lower screens, thus making a greater distance between the bars in the upper screen than in the lower. The frame 29 is given a vibrating motion by reason of the fact that its rear end is pivotally mounted on suitable arms 32, the free ends of which are pivotally mounted in the sides 4, the front end of said frame being connected to a suitable crank-arm 33, which is rotated by a suitable connection, this rotation serving to cause the front end to have a circular movement, which movement serves to vibrate the cleaner and assorter. As shown in the drawings, the screen 30 is of a greater length than the screen 31, and this serves the purpose of carrying the potatoes of the assorted sizes to different positions in rear of the assorter, the potatoes being assorted by reason of the smaller-sized ones dropping through the interstices between the bars of the upper screen onto the lower set of bars.

As shown, the rear of the digger is provided with what may be termed a "grated" table 34, which is divided into front and rear portions by a vertically-extending wall 35, located, approximately, at the center of said table and extending laterally of the digger. This forms, substantially, two compartments, and to these compartments the potatoes are passed from the screens 30 and 31, the potatoes of smaller size from the screen 31 being passed onto the compartment nearest the rear end of the digger, while the larger-sized potatoes coming from the screen 30 are passed onto the rear portion of the table forming the rear compartment. The tables 34 are formed with bars extending laterally of the digger and of a gradual incline, said bars leading to a suitable receptacle, which communicates with an elevator 36, formed substantially similar to the elevator 23, said elevators serving to raise the potatoes to a height sufficient to allow them to readily pass within suitable bags which are held under the delivery-spout, said bags being adapted to receive the potatoes in an obvious manner. The elevators 26 are driven by suitable means, such as shown, although other operating connections may be used, if desired, said elevators being arranged on opposite sides of the table 34 for a reason readily understood.

The digger is provided with a suitable platform 37 at the rear end thereof, upon which the operator or operators stand and on which the bags are supported during the operation of filling.

From this construction, the operation of which will, it is thought, be clearly apparent, it will be seen that during the passage of the potatoes rearward from the point where they are dug up from the ground to the point where they are delivered into the bags they are subjected at all times to the vibration of the machine and of the parts which have a tendency to shake off any dirt which may be formed thereon, but with not sufficient force to injure the potatoes themselves. Another advantage in this construction lies in the fact that there is no labor required excepting the driving of the digger and the attendance of the operators on the back who are attending to the bagging of the potatoes, all intermediate steps being performed automatically.

As will be readily seen, the digger attachment, when not in use, can be entirely removed, if desired, or may be raised to a position where the front of the nose will be above the level of the ground, whereupon the entire implement may be transported from one place to another.

The advantages of this construction are its simple and efficient operation, each part forming its work automatically, the dispensing with any manual labor between the point of digging of the potatoes and the bagging of them, its durability of construction, and its low cost of manufacture.

To allow of the ready raising of the digger-nose when such raising is desirable, I provide a suitable cross-rod 38, on which is mounted a series of segments 39, the outer periphery of which is adapted to receive a chain connected to the digger-nose in any suitable manner. The rod 38 extends outwardly through one of the sides and has at its outer edge a suitable operating-lever, which lever serves as a means to rotate said shaft and raise said digger-nose, the digger-nose being held in its raised position by means of the pawl-and-rack mechanism shown in Fig. 1. Other means may be used for raising the digger-nose, the intention being to raise the nose to a position above the level of the ground in order that the digger may be readily moved from place to place and also preventing any tendency of the digger-nose to pass to a depth below the desired point when in operation.

While I have herein shown a preferred form of carrying my invention into effect, yet I do not desire to limit myself to such preferred details of construction, but claim the right to use any and all modifications thereof which will serve to carry into effect the objects to be attained by this invention in so far as such modifications and changes may fall within the spirit and scope of my said invention.

I claim—

1. A potato-digger, comprising a frame; a digger-nose pivotally and removably secured within said frame; an independent rolling support adjustably secured to said nose, whereby the point of the nose will be held at a substantially predetermined point in the ground relative to said support without varying the position of said frame; means, mounted within said nose, for automatically removing the stalks from the potatoes; a vibrating cleanser and assorter mounted within said frame; means located at the rear end of said frame for delivering the assorted potatoes to proper receptacles therefor; conveyers located within said frame for automatically carrying the potatoes therethrough; and means operated by the forward movement of the digger-frame for imparting movement to the stalk-removing means and to said conveyers, substantially as described.

2. A potato-digger, comprising a frame; a digger-nose removably mounted therein; an independent rolling support adjustably secured to said nose, whereby the point of the nose will be held at a substantially predetermined point in the ground relative to said support without varying the position of said frame; a vibrating cleanser and assorter mounted within said frame; means for removing the stalks from the potatoes, carried by said nose and operated automatically, said means being located between the digger-nose and said vibrating cleanser and assorter; means for independently discharging said assorted potatoes; perforated conveyers located within said frame, said conveyers being adapted to carry the potatoes from said nose to said independent receptacles; and means for imparting movement to said stalk-removing means and the conveyers, said means being operated by the forward movement of the digger-frame, substantially as described.

3. A stalk-remover for potato-diggers, comprising a series of rolls held in yielding contact and having a rotary movement, said rolls moving at a point above the path of movement of the dug potatoes; and a series of curved delivery-tubes mounted in rear of said rolls, to receive the stalks as they pass from said rolls, said tube being adapted to deliver the stalks at a point independent from the delivery portion of the potato-conveying means, substantially as described.

4. A bucket for conveyers, comprising end pieces; a concave perforated front and bottom piece; and a series of bars extending between said end pieces, said bars being located at the rear of the bucket, substantially as described.

In witness whereof I have hereunto set my hand in the presence of two witnesses.

his
  DELPHIS × DENIS.
       mark.

Witnesses:
 J. A. MARION,
 A. W. YOUNG.